United States Patent
Cho et al.

(10) Patent No.: US 9,831,527 B2
(45) Date of Patent: Nov. 28, 2017

(54) ELECTROLYTE FOR LITHIUM BATTERY, LITHIUM BATTERY INCLUDING THE SAME, AND METHOD OF MANUFACTURING ELECTROLYTE FOR LITHIUM BATTERY

(71) Applicant: Samsung SDI Co., Ltd., Yongin-si, Gyeonggi-do (KR)

(72) Inventors: In-Haeng Cho, Yongin-si (KR); Ha-Rim Lee, Yongin-si (KR); Sang-Hoon Kim, Yongin-si (KR); Woo-Cheol Shin, Yongin-si (KR); Jung-Hyun Nam, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 8 days.

(21) Appl. No.: 14/445,000

(22) Filed: Jul. 28, 2014

(65) Prior Publication Data
US 2015/0072247 A1    Mar. 12, 2015

(30) Foreign Application Priority Data
Sep. 11, 2013    (KR) .................. 10-2013-0109212

(51) Int. Cl.
H01M 6/14       (2006.01)
H01M 10/0567    (2010.01)
H01M 10/052     (2010.01)
H01M 10/0525    (2010.01)

(52) U.S. Cl.
CPC ..... *H01M 10/0567* (2013.01); *H01M 10/052* (2013.01); *H01M 10/0525* (2013.01); *H01M 2300/0034* (2013.01); *H01M 2300/0042* (2013.01); *Y02T 10/7011* (2013.01)

(58) Field of Classification Search
CPC .............. H01M 2300/0017; H01M 2300/0025
See application file for complete search history.

(56) References Cited

U.S. PATENT DOCUMENTS 5,652,072 A    7/1997    Lamanna et al.
6,136,477 A    10/2000   Gan et al.
(Continued)

FOREIGN PATENT DOCUMENTS

JP    2680685 B2       11/1997
JP    2007-042440 A    2/2007
(Continued)

OTHER PUBLICATIONS

Patent Abstracts of Japan No. 03-008270 for Patent No. JP 2680685, Nov. 19, 1997, 1 Pages.
(Continued)

*Primary Examiner* — Olatunji Godo
(74) *Attorney, Agent, or Firm* — Lewis Roca Rothgerber Christie LLP

(57) ABSTRACT

An electrolyte for a lithium battery, a lithium battery including the electrolyte, and a method of preparing the electrolyte for a lithium battery. The electrolyte for a lithium battery includes a non-aqueous organic solvent; and about 0.1 wt % to about 1 wt % of lithium nitrate ($LiNO_3$) based on a total weight of the non-aqueous organic solvent. By using the electrolyte for a lithium battery, lifespan cycle properties of the lithium battery may be improved.

14 Claims, 3 Drawing Sheets

(56) References Cited

U.S. PATENT DOCUMENTS

| | | | | |
|---|---|---|---|---|
| 6,153,337 | A * | 11/2000 | Carlson | B01D 71/025 |
| | | | | 427/126.4 |
| 6,383,688 | B1 * | 5/2002 | Inagaki | H01M 6/5077 |
| | | | | 429/188 |
| 2005/0031963 | A1 * | 2/2005 | Im | H01M 10/0569 |
| | | | | 429/332 |
| 2005/0156575 | A1 * | 7/2005 | Mikhaylik | H01M 4/38 |
| | | | | 320/137 |
| 2009/0081559 | A1 * | 3/2009 | Oe | C01D 15/005 |
| | | | | 429/342 |
| 2009/0305130 | A1 | 12/2009 | Xiao et al. | |
| 2010/0129699 | A1 * | 5/2010 | Mikhaylik | H01M 2/1653 |
| | | | | 429/50 |
| 2010/0167121 | A1 | 7/2010 | Arai et al. | |
| 2010/0248036 | A1 * | 9/2010 | Okumurai | H01M 4/485 |
| | | | | 429/330 |
| 2011/0076571 | A1 * | 3/2011 | Matsumoto | H01M 4/139 |
| | | | | 429/326 |

FOREIGN PATENT DOCUMENTS

| | | |
|---|---|---|
| KR | 1999-0063594 | 7/1999 |
| KR | 10-2008-0067003 A | 7/2008 |
| KR | 10-2010-0076911 | 7/2010 |

OTHER PUBLICATIONS

Patent Abstracts of Japan and Machine English Translation of JP 2007-042440 A, Feb. 15, 2007, 11 Pages.
KIPO Office Action dated Dec. 23, 2016, for corresponding Korean Patent Application No. 10-2013-0109212 (6 pages).

* cited by examiner

ELECTROLYTE FOR LITHIUM BATTERY, LITHIUM BATTERY INCLUDING THE SAME, AND METHOD OF MANUFACTURING ELECTROLYTE FOR LITHIUM BATTERY

CROSS-REFERENCE TO RELATED APPLICATION

This application claims priority to and the benefit of Korean Patent Application No. 10-2013-0109212, filed on Sep. 11, 2013, in the Korean Intellectual Property Office, the disclosure of which is incorporated herein in its entirety by reference.

BACKGROUND

1. Field

One or more embodiments relate to an electrolyte for a lithium battery, a lithium battery including the electrolyte for a lithium battery, and a method of preparing the electrolyte for a lithium battery.

2. Description of the Related Art

Lithium secondary batteries used in portable electronic devices for information communication (such as PDAs, mobile phones, or notebook computers), electric bicycles, electric vehicles, or the like, have a discharge voltage that is at least twice as high as that of a conventional battery, and thus, have high energy density.

Lithium secondary batteries generate electric energy by oxidation and reduction reactions occurring when lithium ions are intercalated into/deintercalated from a positive electrode and a negative electrode, each including an active material that enables intercalation and deintercalation of lithium ions, with an organic electrolytic solution or a polymer electrolytic solution interposed between the positive and negative electrodes.

Examples of positive active materials of lithium secondary batteries include oxides including lithium and transition metals that have structures that allow intercalation of lithium ions, such as lithium cobalt oxide ($LiCoO_2$), lithium nickel oxide ($LiNiO_2$), or lithium nickel cobalt manganese oxide ($Li[NiCoMn]O_2$, $Li[Ni_{1-x-y}Co_xM_y]O_2$).

Research is being conducted about various forms of carbonaceous materials (such as synthetic or natural graphite, or hard carbon), which are capable of intercalation/deintercalation of lithium, and non-carbonaceous materials (such as Si).

However, to improve the electrochemical performance of a lithium battery, there is a need to develop a high capacity active material, as well as to optimize various battery components.

SUMMARY

An aspect of one or more embodiments is directed toward an electrolyte for a lithium battery for improving cycle properties of a lithium battery.

An aspect of one or more embodiments is directed toward a lithium battery including the electrolyte.

An aspect of one or more embodiments is directed toward a method of preparing the electrolyte for a lithium battery.

Additional aspects will be set forth in part in the description which follows and, in part, will be apparent from the description, or may be learned by practice of the presented embodiments.

According to one or more embodiments, an electrolyte for a lithium battery includes a non-aqueous organic solvent; and about 0.1 wt % to about 1 wt % lithium nitrate ($LiNO_3$) based on a total weight of the non-aqueous organic solvent.

According to one or more embodiments, a lithium battery includes the electrolyte.

According to one or more embodiments, a method of preparing an electrolyte for a lithium battery includes maintaining a temperature of a non-aqueous organic solvent including a cyclic carbonate compound at a temperature equal to or greater than a melting point of the cyclic carbonate compound; and adding and mixing lithium nitrate ($LiNO_3$) to the non-aqueous organic solvent.

According to one or more embodiments, the temperature of the non-aqueous organic solvent including the cyclic carbonate compound may be maintained at about 30° C. to about 80° C.

According to one or more embodiments, the $LiNO_3$ may be added in a range of about 0.1 wt % to about 1 wt % based on a total weight of the non-aqueous organic solvent.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
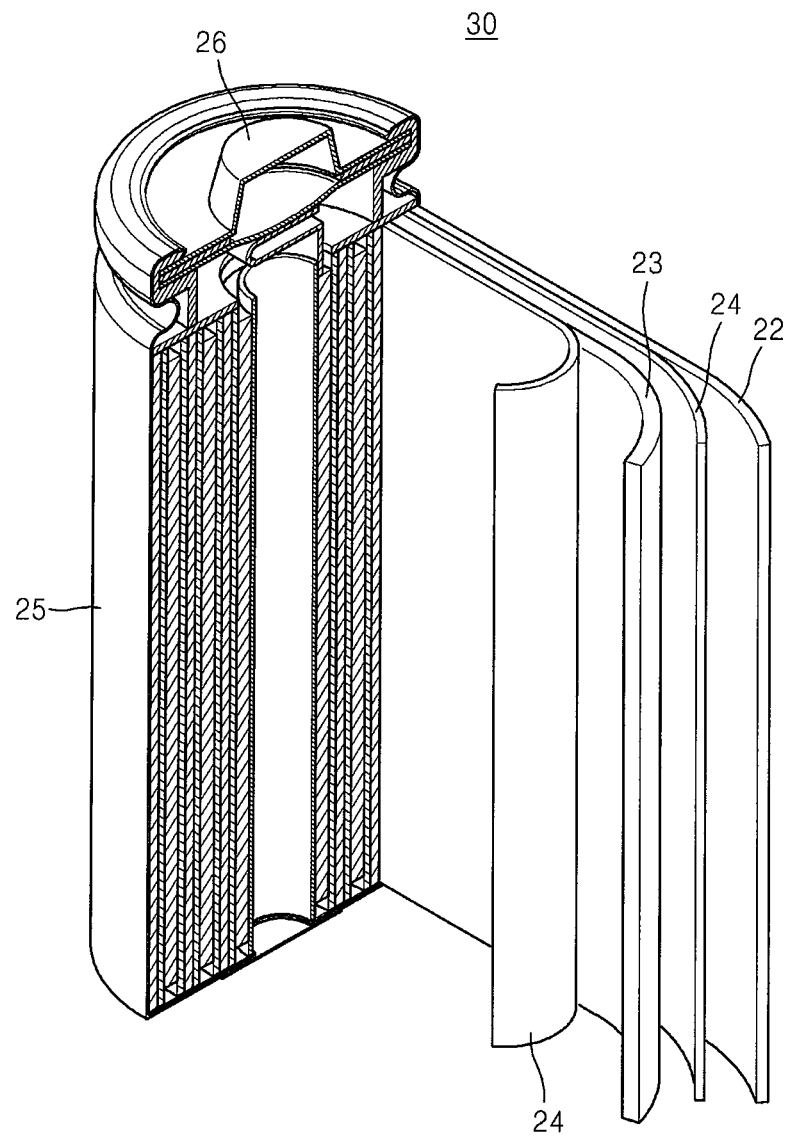
FIG. 1 is a schematic view of a structure of a lithium battery according to an embodiment.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention."

Hereinafter, one or more embodiments are described in more detail.

An electrolyte for a lithium battery according to an embodiment includes a non-aqueous organic solvent and about 0.1 wt % to about 1 wt % of lithium nitrate ($LiNO_3$) based on a total weight of the non-aqueous organic solvent.

Generally, the deterioration of charge and discharge cycle properties of a lithium battery is known to be contributed by a dissolution of an electrolyte solution that occurs at a surface of a positive electrode or a negative electrode. The dissolution of an electrolyte solution that occurs on a surface of a positive electrode or a negative electrode includes dissolution of a non-aqueous solvent and dissolution of a lithium salt, which is a solute. The dissolution reaction brings about changes in the electrolyte solution, reduces charge and discharge efficiency, causes formation of an inactive film of dissolution reaction products on the surface of the positive electrode or the negative electrode, and hinders a charge and discharge reaction of a battery, thereby deteriorating cycle properties of the battery.

To inhibit the deterioration caused by the dissolution of the electrolyte solution, an additive for forming a solid electrolyte interphase (SEI) on the negative electrode or forming a film on the positive electrode is currently being developed. However, there are not many commercially available additives that may effectively form the film at a low cost. More specifically, use of a single additive does not improve the cycle properties in most cases.

Here, the present inventors developed a method of preparing an electrolyte solution that may include a large amount of $LiNO_3$. The electrolyte solution was shown to effectively improve the cycle properties of a lithium battery as well as to improve a room temperature battery life and a high temperature battery life.

The electrolyte for a lithium battery, according to an embodiment, may include about 0.1 wt % to about 1 wt % of $LiNO_3$ based on a total weight of the non-aqueous organic solvent. For example, the electrolyte for a lithium battery may include about 0.5 wt % to about 1 wt % of $LiNO_3$ based on the total weight of the non-aqueous organic solvent.

The amount of $LiNO_3$ added according to embodiment of the present invention is a large amount that may not be found in a conventional electrolyte solution. The electrolyte for a lithium battery may include about 0.1 wt % to about 1 wt % of $LiNO_3$ to show substantial improvements of the cycle properties. When the amount of $LiNO_3$ is less than 0.1 wt % or greater than 1 wt %, it may be concluded based on the Examples (to be discussed later on) that the improvements of cycle properties are not as great.

The non-aqueous organic solvent included in the electrolyte for a lithium battery may act as a medium such that ions contributing to an electrochemical reaction of the battery may move therethrough. As the non-aqueous organic solvent, a carbonate-based compound, an ester-based compound, an ether-based compound, a ketone-based compound, an alcohol-based compound, an aprotic solvent, or a combination thereof may be used.

As the carbonate-based compound, a linear carbonate compound, a cyclic carbonate compound, a fluorocarbonate compound thereof, or a combination thereof may be used. The linear carbonate compound may include, for example, diethyl carbonate (DEC), dimethyl carbonate (DMC), dipropyl carbonate (DPC), methyl propyl carbonate (MPC), ethyl propyl carbonate (EPC), methyl ethyl carbonate (MEC), or a combination thereof; and the cyclic carbonate compound may include, for example, ethylene carbonate (EC), propylene carbonate (PC), butylene carbonate (BC), vinyl ethylene carbonate (VEC), or a combination thereof.

The fluorocarbonate compound may include, for example, fluoroethylene carbonate (FEC), 4,5-difluoroethylene carbonate, 4,4-difluoroethylene carbonate, 4,4,5-trifluoroethylene carbonate, 4,4,5,5-tetrafluoroethylene carbonate, 4-fluoro-5-methyl ethylene carbonate, 4-fluoro-4-methyl ethylene carbonate, 4,5-difluoro-4-methyl ethylene carbonate, 4,4,5-trifluoro-5-methyl ethylene carbonate, trifluoromethyl ethylene carbonate, or a combination thereof.

The carbonate-based compound may be used as a mixture of the linear and cyclic carbonate compounds. For example, when the cyclic carbonate compound is included in an amount of 20 volume % or greater based on a total volume of the non-aqueous organic solvent, cycle properties may be substantially improved. The cyclic carbonate compound may be, for example, included in an amount of about 20 volume % to about 70 volume % based on the total volume of the non-aqueous organic solvent.

The cyclic carbonate compound has higher (more) polarity than the linear carbonate compound and thus, the cyclic carbonate compound has a higher melting point than the linear carbonate compound. For example, ethylene carbonate has a melting point of about 34° C. to about 37° C., and exists as a transparent crystalline solid at room temperature.

As a result, when $LiNO_3$ is added to the cyclic carbonate compound (which has more polarity than the linear carbonate compound) while the cyclic carbonate compound is maintained at a temperature greater than the melting point of the cyclic carbonate compound (for example, at about 30° C. to about 80° C.) and then stirred, and the linear carbonate compound may be mixed thereto, a large amount of $LiNO_3$ (such as an amount of about 0.1 wt % to about 1 wt %) may be dissolved in the non-aqueous organic solvent.

As the carbonate-based compound, a fluorocarbonate compound may be further mixed together with the linear and/or the cyclic carbonate compound. The fluorocarbonate compound may increase the solubility of the lithium salt to improve ion conductivity of the electrolyte for a lithium battery and may contribute to the formation of a film on the negative electrode. According to an embodiment, the fluorocarbonate compound may be FEC. The fluorocarbonate compound may be used in an amount of about 1 volume % to about 30 volume % based on the total volume of the non-aqueous electrolyte solution. When the fluorocarbonate compound is used in an amount in the range above, a suitable viscosity may be maintained and desired effects may be obtained. According to an embodiment, the non-aqueous organic solvent may further include vinyl ethylene carbonate (VEC) along with FEC. Here, VEC may be included in an amount of about 0.1 volume % to about 10 volume % based on the total volume of the non-aqueous electrolyte solution.

As the ester-based compound, methyl acetate, acetate, n-propyl acetate, dimethylacetate, methyl propionate, ethyl propionate, γ-butyrolactone, decanolide, valerolactone, mevalonolactone, caprolactone, methyl formate, or the like may be used. As the ether-based compound, dibutyl ether, tetraglyme, diglyme, 1,2-dimethoxy ethane, 1,2-diethoxy ethane, ethoxy methoxy ethane, 2-methyl tetrahydrofuran, tetrahydrofuran, or the like may be used. As the ketone-based compound, cyclohexanone or the like may be used. Also, as the alcohol-based compound, ethyl alcohol, isopropyl alcohol, or the like may be used.

As other aprotic solvents, dimethyl sulfoxide, 1,2-dioxolane, sulfolane, methyl sulfolane, 1,3-dimethyl-2-imidazolidinone, N-methyl-2-pyrrolidinone, formamide, dimethyl formamide, acetonitrile, nitromethane, trimethyl phosphate, triethyl phosphate, phosphoric acid, trioctyl phosphate, phosphate triester, or the like may be used.

The non-aqueous organic solvent may be used alone or as a mixture of two or more thereof. When a mixture of two or more non-aqueous organic solvents is used, a mixture ratio (i.e., ratio of the amount of each component in the mixture) may be suitably adjusted according to desired battery performance.

The electrolyte for a lithium battery may further include a lithium salt.

The lithium salt acts as a supply source of lithium ions in the lithium battery to enable basic operation of the lithium battery. The lithium salt may be any one of various suitable lithium salts that are used in a lithium battery. As a material that may be dissolved well in the non-aqueous electrolyte, for example, at least one of LiCl, LiBr, LiI, LiClO$_4$, LiB$_{10}$Cl$_{10}$, LiPF$_6$, CF$_3$SO$_3$Li, CH$_3$SO$_3$Li, C$_4$F$_9$SO$_3$Li (CF$_3$SO$_2$)$_2$NLi, LiN(C$_x$F$_{2x+1}$SO$_2$)(C$_y$F$_{2+y}$SO$_2$)(wherein, x and y are natural numbers), CF$_3$CO$_2$Li, LiAsF$_6$, LiSbF$_6$, LiAlCl$_4$, LiAlF$_4$, lithium chloroborate, lower aliphatic carbonic acid lithium, 4-phenyl boric acid lithium, lithium imide, etc. may be used.

To achieve practical performance of the lithium battery, the lithium salt may be used at a concentration of about 0.1 M to about 2.0 M. When the concentration of the lithium salt is within the range described above, the electrolyte may have suitable conductivity and viscosity to show excellent electrolyte properties and thus, enable effective movement of lithium ions.

The electrolyte for a lithium battery may further include other additives to contribute to the formation of a stable SEI or film, thus further improve the cycle properties.

Examples of suitable additives include tris(trimethylsilyl) phosphate (TMSPa), lithium difluoro(oxalato) borate (Li-FOB), vinylene carbonate (VC), propane sultone (PS), succinonitrile (SN), LiBF$_4$, a silane compound having a functional group that is capable of forming a siloxane bond such as acryl, amino, epoxy, methoxy, ethoxy, vinyl, or the like, and a silazane compound such as hexamethyldisilazane. The additives may be further added to the electrolyte for a lithium battery alone or in combination of two or more thereof.

The additive may be added in an amount of about 0.01 wt % to about 10 wt % based on the total weight of the non-aqueous organic solvent. For example, the additive may be added in an amount of about 0.05 wt % to about 10 wt %, about 0.1 wt % to about 5 wt %, or about 0.5 wt % to about 4 wt %, based on the total weight of the non-aqueous organic solvent. However, the amount of the additive is not particularly limited as long as the amount does not substantially decrease the improvement of a capacity retention rate of the lithium battery from the use of the electrolyte.

A lithium battery according to another embodiment includes a positive electrode, a negative electrode, and the electrolyte for a lithium battery described above disposed between the positive and negative electrodes. The lithium battery may be manufactured according to a manufacturing method that is known in the art.

FIG. 1 is a schematic view of a structure of a lithium battery according to an embodiment.

Referring to FIG. 1, the lithium battery 30 includes a positive electrode 23, a negative electrode 22, and a separator 24 disposed between the positive and negative electrodes 23 and 22. The positive electrode 23, the negative electrode 22, and the separator 24 are wound or folded to be housed in a battery case 25. Then, an electrolyte is injected into the battery case 25, followed by sealing the battery case 25 with an encapsulation member 26, thereby completing the manufacture of the lithium battery 30. The battery case 25 may be a cylindrical, rectangular, or thin film battery case. The lithium battery 30 may be a lithium ion battery.

The positive electrode 23 includes a positive electrode current collector, and a positive active material layer formed on the positive electrode current collector.

The positive electrode current collector generally has a thickness of about 3 μm to about 500 μm. Any suitable positive electrode current collector may be used, as long as the positive electrode current collector has a suitable electrical conductivity and does not induce chemical changes to the battery. Examples of the positive electrode current collector include copper, stainless steel, aluminum, nickel, titanium, calcined carbon, copper, stainless steel surface-treated with carbon, nickel, titanium, silver, or the like, and aluminum-cadmium alloy. Also, binding strength of the positive active material may be increased by forming minute irregularities on a surface of the positive electrode current collector. The positive electrode current collector may be used in various suitable forms such as a film, a sheet, a foil, a net, a porous body, a foaming body, or a non-woven fabric.

The positive active material layer includes the positive active material, a binder, and optionally, a conductive agent.

As the positive active material, any suitable lithium-containing metal oxide generally used in the art may be used. For example, at least one mixed oxide of lithium and a metal selected from cobalt, manganese, nickel, or a combination thereof may be used. In one embodiment, a compound represented by any one of the following Formulae may be used: Li$_a$A$_{1-b}$L$_b$D$_2$ (wherein, 0.90≤a≤1 and 0≤b≤0.5); Li$_a$E$_{1-b}$L$_b$O$_{2-c}$D$_c$ (wherein, 0.90≤a≤1, 0≤b≤0.5, and 0≤c≤0.05); LiE$_{2-b}$L$_b$O$_{4-c}$D$_c$ (wherein, 0≤b≤0.5, 0≤c≤0.05); Li$_a$Ni$_{1-b-c}$Co$_b$L$_c$D$_\alpha$ (wherein, 0.90≤a≤1, 0≤b≤0.5 and 0≤c≤0.05, 0<α≤2); Li$_a$Ni$_{1-b-c}$Co$_b$L$_c$O$_{2-\alpha}$R$_\alpha$ (wherein, 0.90≤a≤1, 0≤b≤0.5 and 0≤c≤0.05, 0<α<2); Li$_a$Ni$_{1-b-c}$Co$_b$L$_c$O$_{2-\alpha}$R$_2$ (wherein, 0.90≤a≤1, 0≤b≤0.5 and 0≤c≤0.05, 0<α<2); Li$_a$Ni$_{1-b-c}$Mn$_b$L$_c$D$_\alpha$ (wherein, 0.90≤a≤1, 0≤b≤0.5 and 0≤c≤0.05, 0<α≤2); Li$_a$Ni$_{1-b-c}$Mn$_b$L$_c$O$_{2-\alpha}$R$_\alpha$ (wherein, 0.90≤a≤1, 0≤b≤0.5 and 0≤c≤0.05, 0<α<2); Li$_a$Ni$_{1-b-c}$Mn$_b$L$_c$O$_{2-\alpha}$R$_2$ (wherein, 0.90≤a≤1, 0≤b≤0.5, 0≤c≤0.05, and 0<α<2); Li$_a$Ni$_b$E$_c$G$_d$O$_2$ (wherein, 0.90≤a≤1, 0≤b≤0.9, 0≤c≤0.5, and 0.001≤d≤0.1); Li$_a$Ni$_b$Co$_c$Mn$_d$GeO$_2$ (wherein, 0.90≤a≤1, 0≤b≤0.9, 0≤c≤0.5, and 0≤d≤0.5, 0.001≤e≤0.1); Li$_a$NiG$_b$O$_2$ (wherein, 0.90≤a≤1 and 0.001≤b≤0.1); Li$_a$CoG$_b$O$_2$ (wherein, 0.90≤a≤1 and 0.001≤b≤0.1); Li$_a$MnG$_b$O$_2$ (wherein, 0.90≤a≤1 and 0.001≤b≤0.1); Li$_a$Mn$_2$G$_b$O$_4$ (wherein, 0.90≤a≤1 and 0.001≤b≤0.1); QO$_2$; QS$_2$; LiQS$_2$; V$_2$O$_5$; LiV$_2$O$_5$; LIMO$_2$; LiNiVO$_4$; Li$_{(3-f)}$J$_2$(PO$_4$)$_3$(0≤f≤2); Li$_{(3-f)}$Fe$_2$(PO$_4$)$_3$(0≤f≤2); or LiFePO$_4$.

In the Formulae above, A is nickel (Ni), cobalt (Co), manganese (Mn), or a combination thereof; L is aluminum (Al), Ni, Co, Mn, chromium (Cr), iron (Fe), magnesium (Mg), strontium (Sr), vanadium (V), a rare earth metal element, or a combination thereof; D is oxygen (O), fluorine (F), sulfur (S), phosphorus (P), or a combination thereof; E is Co, Mn, or a combination thereof; R is F, S, P, or a combination thereof; G is Al, Cr, Mn, Fe, Mg, lanthanum (La), cerium (Ce), Sr, V, or a combination thereof; Q is titanium (Ti), molybdenum (Mo), Mn, or a combination thereof; M is Cr, V, Fe, scandium (Sc), yttrium (Y), or a combination thereof; and J is V, Cr, Mn, Co, Ni, copper (Cu), or a combination thereof.

For example, the positive electrode material may be LiCoO$_2$, LiMn$_x$O$_{2x}$ (x=1, 2), LiNi$_{1-x}$Mn$_x$O$_{2x}$ (0<x<1), LiNi$_{1-x-y}$Co$_x$Mn$_y$O$_2$ (0≤x≤0.5, 0≤y≤0.5), FePO$_4$, or the like.

The compound (i.e., the positive active material) may have a coating layer thereon, or the compound without a coating layer and the compound having a coating layer thereon may be mixed together. The coating layer may include a coating compound including an oxide of a coating element, a hydroxide of a coating element, an oxyhydroxide of the coating element, an oxycarbonate of the coating element, or a hydroxycarbonate of the coating element. The coating compound forming the coating layer may be amorphous or crystalline. The coating element included in the coating layer may be Mg, Al, Co, potassium (K), sodium (Na), calcium (Ca), silicon (Si), Ti, V, tin (Sn), germanium (Ge), gallium (Ga), boron (B), arsenic (As), zirconium (Zr), or a combination thereof. A method of forming the coating layer may be any suitable method (for example, spray coating or immersion) that does not negatively affect properties of the positive electrode by using the element in the compound, and the method is known to one of ordinary skill in the art and thus, the description thereof will not be repeated herein.

The binder binds (e.g., thoroughly binds) the positive active material particles together and binds (e.g., thoroughly binds) the positive active material to the positive electrode current collector. Examples of the binder include, but are not limited to, polyvinyl alcohol, carboxymethyl cellulose, hydroxyl propyl cellulose, diacetyl cellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, a styrene-butadiene rubber, an acrylated styrene-butadiene rubber, an epoxy resin, and nylon.

The conductive agent is used to provide or enhance conductivity to an electrode, and the conductive agent may be any suitable conductive material that does not cause chemical changes to the battery. Examples of the conductive agent include natural graphite, synthetic graphite, carbon black, acetylene black, Ketjen black, carbon fiber; metal powder of copper, nickel, aluminum, or silver; and metal fiber. Also, the conductive agent may be a conductive material such as a polyphenylene derivative or the like, that is used alone or as a mixture of two or more thereof.

The negative electrode 22 includes a negative electrode current collector and a negative active material layer formed on the negative electrode current collector.

The negative electrode current collector generally has a thickness of about 3 μm to about 500 μm. Any suitable negative electrode current collector may be used, as long as the negative electrode current collector has a suitable electrical conductivity and does not induce chemical changes to the battery. Examples of the negative electrode current collector include copper, stainless steel, aluminum, nickel, titanium, calcined carbon, copper, stainless steel surface-treated with carbon, nickel, titanium, silver, or the like, and aluminum-cadmium alloy. Also, the binding strength of the negative active material may be increased by forming minute irregularities on a surface of the negative electrode current collector. The negative electrode current collector may be used in various suitable forms such as a film, a sheet, a foil, a net, a porous body, a foaming body, or a non-woven fabric.

The negative active material layer includes the negative active material, a binder, and optionally, a conductive agent.

The negative active material may be any one of various suitable materials that are used as a negative active material for a lithium battery in the art. For example, a lithium metal, a metal alloyable with lithium, a transition metal oxide, a metal that may dope and undope lithium, or a material capable of reversible intercalation and deintercalation of lithium ions may be used, and the negative active material may be used as a mixture or a bound form of two or more thereof.

As the alloy of the lithium metal, an alloy of lithium and a metal selected from Na, K, rubidium (Rb), cesium (Cs), francium (Fr), beryllium (Be), Mg, Ca, Sr, Si, stibium (Sb), lead (Pb), indium (In), zinc (Zn), barium (Ba), radon (Ra), Ge, Al, or Sn, may be used.

Non-limiting examples of the transition metal oxide include a tungsten oxide, a molybdenum oxide, a titanium oxide, a lithium titanium oxide, a vanadium oxide, and a lithium vanadium oxide.

The material that may dope and undope lithium may be, for example, Si, $SiO_2$, a Si—X alloy (wherein, X is an alkali metal, an alkaline earth metal, a Group 13 element, a Group 14 element other than Sn, a Group 15 element, a Group 16 element, a transition metal, a rare earth metal, or a combination thereof), Sn, $SnO_2$, a Sn—X alloy (wherein, X is an alkali metal, an alkaline earth metal, a Group 13 element, a Group 14 element other than Sn, a Group 15 element, a Group 16 element, a transition metal, a rare earth metal, or a combination thereof). The element X may be Mg, Ca, Sr, Ba, Ra, Sc, Y, Ti, Zr, hafnium (Hf), rutherfordium (Rf), V, niobium (Nb), tantalum (Ta), dubnium (Db), Cr, Mo, tungsten (W), seaborgium (Sg), technetium (Tc), rhenium (Re), bohrium (Bh), Fe, Pb, Ru, osmium (Os), hassium (Hs), rhodium (Rh), Ir, Pd, platinum (Pt), Cu, silver (Ag), gold (Au), Zn, cadmium (Cd), B, Al, Ga, Sn, In, Ti, Ge, P, As, Sb, bismuth (Bi), S, selenium (Se), tellurium (Te), polonium (Po), or a combination thereof.

As the material that may reversibly intercalate and deintercalate lithium ions, any suitable carbon-based negative active material that is generally used in a lithium battery, such as crystalline carbon, amorphous carbon, or a combination thereof may be used. Non-limiting examples of the crystalline carbon include natural graphite, synthetic graphite, expandable graphite, graphene, fullerene soot, carbon nanotubes, carbon fibers, and the like. Non-limiting examples of the amorphous carbon include soft carbon (low-temperature calcined carbon), hard carbon, mesophase pitch carbide, calcined coke, and the like. The carbon-based negative active material may have a spherical form, a flat form, a fiber form, a tube form, or a powder form.

The binder binds (e.g., thoroughly binds) negative active material particles together and binds (e.g., thoroughly binds) the negative active material to the negative electrode current collector. Representative examples of the binder include, but are not limited to, polyvinyl alcohol, carboxymethyl cellulose, hydroxyl propyl cellulose, diacetyl cellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, a styrene-butadiene rubber, an acrylated styrene-butadiene rubber, an epoxy resin, and nylon.

The conductive agent is used to provide or enhance conductivity to an electrode, and the conductive agent may be any suitable conductive material that does not cause chemical changes to the battery. Examples of the conductive agent include natural graphite, synthetic graphite, carbon black, acetylene black, Ketjen black, a carbonaceous material such as carbon fiber; a metallic material such as metal fiber, or metal powder of copper, nickel, aluminum, or silver; and a conductive polymer such as a polyphenylene derivative, or a mixture thereof.

Each of the positive and negative active materials, the conductive agent, and the binder may be mixed in a solvent to prepare an active material composition, and the active material composition is coated on a current collector to form the positive and negative electrodes 23 and 22, respectively.

A method of manufacturing the electrode is known in the art, and thus, description of the method is not repeated herein. The solvent may be N-methyl pyrrolidone (NMP), acetone, water, or the like, but the solvent is not limited thereto.

The positive electrode 23 may be separated from the negative electrode 22 by the separator 24. The separator 24 may be any of various suitable separators typically used in a lithium battery. For example, the separator 24 may include a material that has a low resistance to migration of ions of an electrolyte and an excellent electrolytic solution-retaining capability. For example, the separator 24 may include a material selected from glass fiber, polyester, Teflon, polyethylene, polypropylene, polytetrafluoroethylene (PTFE), or a combination thereof, each of which may be nonwoven or woven. The separator 24 may have a pore size of about 0.01 μm to about 10 μm and a thickness of about 3 μm to about 100 μm.

The electrolyte is an electrolyte for a lithium battery as described above. The electrolyte includes about 0.1 wt % to about 1 wt % of $LiNO_3$ based on the total weight of the non-aqueous organic solvent. The electrolyte is injected between the positive and negative electrodes 23 and 22 (separated by the separator 24).

In addition to mobile phones and laptops, the lithium battery is suitable for uses in devices that require high capacity, high output, and high-temperature driving, such as electric vehicles, and the lithium battery may be combined with an existing internal combustion engine, a fuel cell, a super capacitor, or the like for use in a hybrid vehicle. Furthermore, the lithium battery may be used in any other applications that require high power output, high voltage, and high-temperature driving, such as electric bicycles or gearing tools.

According to another embodiment, a method of preparing an electrolyte for a lithium battery includes:

maintaining a temperature of a non-aqueous organic solvent including cyclic carbonate compound at a temperature equal to or greater than a melting point of the cyclic carbonate compound; and adding $LiNO_3$ to the non-aqueous organic solvent and mixing the same.

A temperature of the non-aqueous organic solvent including the cyclic carbonate compound may be maintained at a temperature equal to or greater than the melting point of the cyclic carbonate compound, for example, at a temperature of about 30° C. to about 80° C. After maintaining the temperature of the solvent including the cyclic carbonate at a temperature equal to or greater than the melting point of a solvent having relative high polarity (such as the cyclic carbonate compound), $LiNO_3$ may be added thereto and then mixture may be stirred to dissolve $LiNO_3$ at a high concentration.

After adding and mixing $LiNO_3$, the linear carbonate may be further added thereto to suitably adjust the amount of $LiNO_3$.

Through the method described above, about 0.1 wt % to about 1 wt % of $LiNO_3$ may be added, based on the total weight of the non-aqueous organic solvent.

Hereinafter, example embodiments will be described in more detail with reference to examples. However, the examples are illustrated for illustrative purpose only and do not limit the scope of the present invention.

Preparing an Electrolyte

Manufacturing Example 1

Ethylene carbonate (EC) was heated to and maintained at a temperature of 50° C., then $LiNO_3$ was added thereto, and then stirred to prepare a mixture solution. After completely dissolving $LiNO_3$, ethyl methyl carbonate (EMC) and diethyl carbonate (DEC) were further mixed to the mixture solution, and $LiPF_6$ was added to the mixture at a concentration of 0.9 M to prepare an electrolyte. In the electrolyte, EC:EMC:DEC were mixed in a volume ratio of 30:50:20, and $LiNO_3$ was mixed in an amount of 0.1 wt % based on the total weight of the mixed solvent.

Manufacturing Example 2

An electrolyte was manufactured in the same manner as in Manufacturing Example 1, except that $LiNO_3$ was mixed in an amount of 0.5 wt % based on the total weight of the mixed solvent.

Manufacturing Example 3

An electrolyte was manufactured in the same manner as in Manufacturing Example 1, except that $LiNO_3$ was mixed in an amount of 1.0 wt % based on the total weight of the mixed solvent.

Manufacturing Example 4

An electrolyte was manufactured in the same manner as in Manufacturing Example 3, except that 6 wt % of FEC based on the total weight of mixed solvent was further added to the mixed solvent.

Manufacturing Example 5

An electrolyte was manufactured in the same manner as in Manufacturing Example 3, except that 6 wt % of FEC and 0.5 wt % of VEC based on the total weight of mixed solvent were further added to the mixed solvent.

Comparative Manufacturing Example 1

An electrolyte was manufactured by adding $LiPF_6$ in a concentration of 0.9 M to a mixed solvent in which EC:DMC:DEC were mixed in a volume ratio of 30:50:20. No $LiNO_3$ was added.

Comparative Manufacturing Example 2

An electrolyte was manufactured in the same manner as in Manufacturing Example 1, except that $LiNO_3$ was added in an amount of 0.05 wt % based on the total weight of the mixed solvent.

Comparative Manufacturing Example 3

An electrolyte was manufactured in the same manner as in Manufacturing Example 1, except that $LiNO_3$ was mixed in an amount of 1.5 wt % based on the total weight of the mixed solvent.

Evaluating Cell Properties According to the Amount of LiNO$_3$

Preparing Evaluation Cells

Example 1

Positive active material powder having a composition of LiCoO$_2$ and a carbon conductive agent (Super-P; available from Timcal Ltd.) were uniformly mixed in a weight ratio of 90:5, and a polyvinylidene fluoride (PVDF) binder solution was added thereto to prepare a slurry having a weight ratio of the active material:carbon conductive agent:binder of 90:5:5. After coating the active material slurry on an aluminum foil having a thickness of 15 μm, the coated aluminum foil was dried and then pressed to prepare a positive electrode. Here, a mixture density of the positive electrode plate was 5.1 g/cc.

When preparing the cell, lithium metal was used as a counter electrode, a polypropylene separator (STAR 20, available from Asahi) was used as a separator, an electrolyte solution was added between the positive electrode and the counter electrode to prepare a pressed 2032-type coin half cell. As the electrolyte, the electrolyte prepared in Manufacturing Example 1 was used.

Example 2

A coin half cell was prepared in the same manner as in Example 1, except that the electrolyte prepared in Manufacturing Example 2 was used.

Example 3

A coin half cell was prepared in the same manner as in Example 1, except that the electrolyte prepared in Manufacturing Example 3 was used.

Comparative Example 1

A coin half cell was prepared in the same manner as in Example 1, except that the electrolyte prepared in Comparative Manufacturing Example 1 was used.

Comparative Example 2

A coin half cell was prepared in the same manner as in Example 1, except that the electrolyte prepared in Comparative Manufacturing Example 2 was used.

Comparative Example 3

A coin half cell was prepared in the same manner as in Example 1, except that the electrolyte prepared in Comparative Manufacturing Example 3 was used.

Evaluation Example 1

Evaluating Lifespan Properties

Cycle properties of the coin half cells prepared in Examples 1-3 and Comparative Examples 1-3 were compared by repeating charge/discharge once at 0.1 C/0.1 C, once at 0.2 C/0.2 C, and 200 times at 1.0 C/1.0 C. The charge and discharge experiment was performed at room temperature of 25° C. Here, charge/discharge conditions were CC-CV (0.01 C cut-off) and CV (1.5 V cut-off). Measurement results of specific discharge capacity are shown in FIG. 2.

Figure 2:
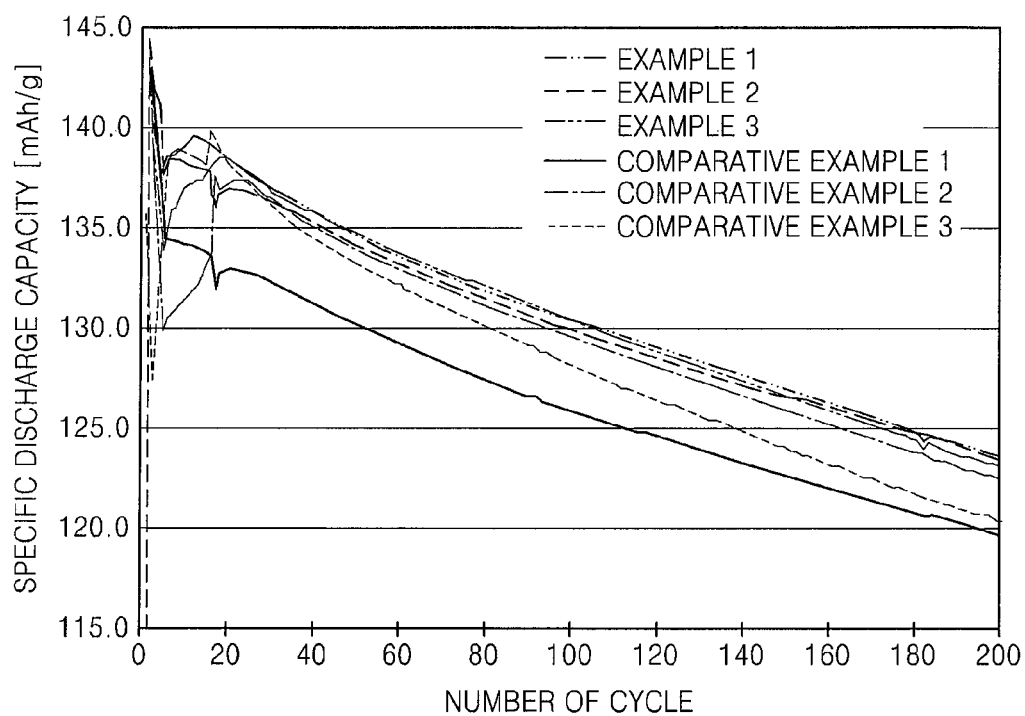
FIG. 2 shows experimental results of lifespan properties of the coin half cells prepared in Examples 1-3 and Comparative Examples 1-3.

As shown in FIG. 2, the coin half cells prepared in Examples 1-3, which include LiNO$_3$ in an amount of about 0.1 wt % to about 1 wt %, showed improved cycle properties compared to the coin half cells prepared in Comparative Examples 1-3.

Evaluating Cell Properties According to the Addition of LiNO$_3$ and Fluorocarbonate Compound Preparing Evaluation Cells Example 4

Positive active material powder having a composition of LiCoO$_2$ and a carbon conductive agent (Super-P; available from Timcal Ltd.) were uniformly mixed in a weight ratio of 90:5, and a PVDF binder solution was added thereto to prepare a slurry having a weight ratio of the active material: carbon conductive agent:binder of 90:5:5. After coating the active material slurry on an aluminum foil having a thickness of 15 μm, the coated aluminum foil was dried and pressed to prepare a positive electrode. Here, a mixture density of the positive electrode plate was 5.1 g/cc.

As a negative active material, graphite powder and a PVDF binder were mixed in a weight ratio of 1:1 to prepare a mixture, and N-methyl pyrrolidone was added to the mixture such that solid content thereof was about 60 wt %, to prepare a negative active material slurry. The prepared slurry was coated on a copper foil current collector having a thickness of 10 μm, and then dried and pressed to prepare a negative electrode.

The prepared positive electrode, negative electrode, and a polyethylene separator having a thickness of 20 μml (product name: STAR20, available from Asahi) were used and an electrolyte was injected between the positive electrode and the negative electrode to prepare a 18650-type lithium battery. Here, the electrolyte prepared in Manufacturing Example 4 was used.

Example 5

A lithium battery was prepared in the same manner as in Example 4, except that the electrolyte prepared in Manufacturing Example 5 was used.

Comparative Example 4

A lithium battery was prepared in the same manner as in Example 4, except that the electrolyte prepared in Comparative Manufacturing Example 1 was used.

Evaluation Example 2: Evaluating Lifespan Properties at Room Temperature (25° C.)

Cycle properties of the lithium batteries prepared in Examples 4-5 and Comparative Example 4 were compared by repeating charge/discharge once at 0.1 C/0.1 C, once at 0.2 C/0.2 C, and 200 times at 1.0 C/1.0 C. The charge and discharge experiment was performed at room temperature of 25° C. Here, charge/discharge conditions were CC-CV (0.01 C cut-off) and CV (1.5 V cut-off). Measurement results of discharge capacity are shown in FIG. 3.

Figure 3:
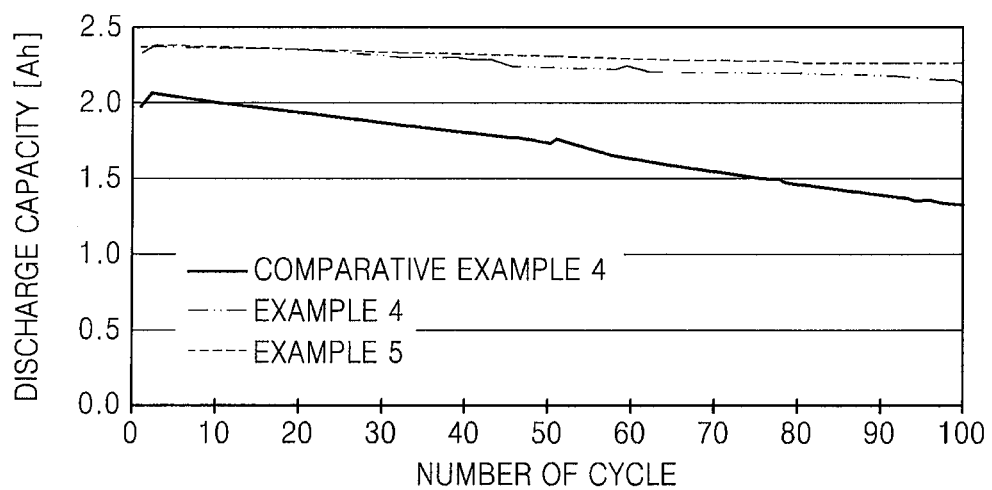
FIG. 3 shows experimental results of lifespan properties of the lithium batteries prepared in Examples 4 and 5, and Comparative Example 4 at room temperature (25° C.)

As shown in FIG. 3, the lithium batteries prepared in Examples 4 and 5, which include LiNO$_3$ and FEC, showed substantially improved lifespan properties at room temperature compared to the lithium battery prepared in Comparative Example 4, which did not include LiNO$_3$.

Evaluation Example 3: Evaluating Lifespan Properties at High Temperature (45° C.)

Cycle properties of the lithium batteries prepared in Examples 4-5 and Comparative Example 4 were compared by repeating charge/discharge once at 0.1 C/0.1 C, once at 0.2 C/0.2 C, and 200 times at 1.0 C/1.0 C. The charge and discharge experiment was performed at a high temperature of 45° C. Here, charge/discharge conditions were CC-CV (0.01 C cut-off) and CV (1.5 V cut-off). Measurement results of discharge capacity are shown in FIG. 4.

Figure 4:
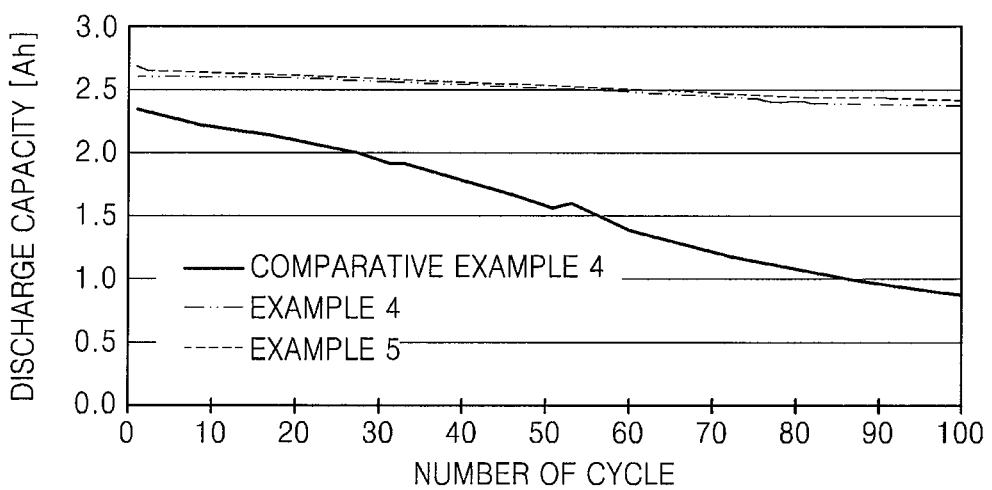
FIG. 4 shows experimental results of lifespan properties of the lithium batteries prepared in Examples 4 and 5, and Comparative Example 4 at a high temperature (45° C.).

As shown in FIG. 4, the lithium batteries prepared in Examples 4 and 5 including LiNO$_3$ and FEC showed substantially improved lifespan properties at a high temperature, compared to the lithium battery prepared in Comparative Example 4, which did not include LiNO$_3$.

As described above, according to the one or more of the above embodiments, lifespan cycle properties of a lithium battery may be improved by using the electrolyte for a lithium battery.

It should be understood that the example embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present invention as defined by the following claims, and equivalents thereof.

What is claimed is:

1. An electrolyte for a lithium battery comprising:
   a non-aqueous organic solvent consisting of 20 volume % or more of a cyclic carbonate compound based on a total volume of the non-aqueous organic solvent, greater than 2 volume % to equal to or less than 30 volume % of a fluorocarbonate compound based on a total volume of the non-aqueous organic solvent, and one or more compounds selected from the group consisting of a linear carbonate-based compound, an ester-based compound, an ether-based compound, a ketone-based compound, an alcohol-based compound, an aprotic solvent, and vinyl ethylene carbonate (VEC);
   a lithium salt; and
   0.1 wt % to 0.5 wt % lithium nitrate (LiNO$_3$) based on a total weight of the non-aqueous organic solvent.

2. The electrolyte for a lithium battery of claim 1, wherein the non-aqueous organic solvent further comprises the linear carbonate-based compound, the ester-based compound, the ether-based compound, the ketone-based compound, the alcohol-based compound, the aprotic solvent, or a combination thereof.

3. The electrolyte for a lithium battery of claim 1, wherein the linear carbonate compound is selected from the group consisting of diethyl carbonate (DEC), dimethyl carbonate (DMC), dipropyl carbonate (DPC), methyl propyl carbonate (MPC), ethyl propyl carbonate (EPC), methyl ethyl carbonate (MEC), and combinations thereof.

4. The electrolyte for a lithium battery of claim 1, wherein the cyclic carbonate compound is selected from the group consisting of ethylene carbonate (EC), propylene carbonate (PC), butylene carbonate (BC), vinyl ethylene carbonate (VEC), and combinations thereof.

5. The electrolyte for a lithium battery of claim 1, wherein the fluorocarbonate compound is selected from the group consisting of fluoroethylene carbonate (FEC), 4,5-difluoroethylene carbonate, 4,4-difluoroethylene carbonate, 4,4,5-trifluoroethylene carbonate, 4,4,5,5-tetrafluoroethylene carbonate, 4-fluoro-5-methyl ethylene carbonate, 4-fluoro-4-methyl ethylene carbonate, 4,5-difluoro-4-methyl ethylene carbonate, 4,4,5-trifluoro-5-methyl ethylene carbonate, trifluoromethyl ethylene carbonate, and combinations thereof.

6. The electrolyte for a lithium battery of claim 1, wherein the fluorocarbonate compound is fluoroethylene carbonate (FEC).

7. The electrolyte for a lithium battery of claim 1, wherein the non-aqueous organic solvent further comprises the vinyl ethylene carbonate (VEC).

8. The electrolyte for a lithium battery of claim 7, further comprising 0.1 volume % to 10 volume % of VEC based on a total volume of the non-aqueous organic solvent.

9. The electrolyte for a lithium battery of claim 1, further comprising at least one additive selected from the group consisting of tris(trimethylsilyl) phosphate (TMSPa), lithium difluorooxalato borate (LiFOB), vinylene carbonate (VC), propane sultone (PS), succinonitrile (SN), LiBF$_4$, a silane compound having a functional group capable of forming a siloxane bond, and a silazane compound.

10. The electrolyte for a lithium battery of claim 1, wherein the lithium salt is at least one lithium salt selected from the group consisting of LiPF$_6$, LiBF$_4$, LiAsF$_6$, LiClO$_4$, LiCF$_3$SO$_3$, LiSbF$_6$, CF$_3$SO$_3$Li, LiN(SO$_2$CF$_3$)$_2$, LiC$_4$F$_3$SO$_3$, LiAlF$_4$, LiAlCl$_4$, LiN(SO$_2$C$_2$F$_5$)$_2$, LiN(C$_x$F$_{2x+1}$SO$_2$)(C$_y$F$_{2+y}$SO$_2$) where x and y are natural numbers, LiCl, and LiI.

11. A lithium battery comprising:
    a positive electrode;
    a negative electrode; and
    the electrolyte according to claim 1.

12. A method of preparing an electrolyte for a lithium battery, the method comprising:
    maintaining a temperature of a non-aqueous organic solvent comprising a cyclic carbonate compound at a temperature of 30° C. to 80° C.; and
    mixing lithium nitrate (LiNO$_3$) with the non-aqueous organic solvent maintained at the temperature of 30° C. to 80° C., the LiNO$_3$ being added in a range of 0.1 wt % to 0.5 wt % based on a total weight of the non-aqueous organic solvent,
    wherein the non-aqueous organic solvent consists of 20 volume % or more of the cyclic carbonate compound based on a total volume of the non-aqueous organic solvent and greater than 2 volume % to equal to or less than 30 volume % of a fluorocarbonate compound based on a total volume of the non-aqueous organic solvent.

13. The method of claim 12, further comprising mixing a linear carbonate compound to the non-aqueous organic solvent after mixing the LiNO$_3$.

14. An electrolyte for a lithium battery consisting of:
    a non-aqueous organic solvent consisting of a mixture of linear and cyclic carbonate compounds;
    a lithium salt; and
    0.1 wt % to 0.5 wt % lithium nitrate (LiNO$_3$) based on a total weight of the non-aqueous organic solvent.

* * * * *